US008689955B2

(12) United States Patent
Mori (10) Patent No.: US 8,689,955 B2
(45) Date of Patent: Apr. 8, 2014

(54) SHOCK ABSORBING STRUCTURE (75) Inventor: Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 60 days.

(21) Appl. No.: 13/393,070

(22) PCT Filed: Sep. 14, 2009

(86) PCT No.: PCT/JP2009/065996
§ 371 (c)(1),
(2), (4) Date: Feb. 28, 2012

(87) PCT Pub. No.: WO2011/030453
PCT Pub. Date: Mar. 17, 2011

(65) Prior Publication Data
US 2012/0152675 A1    Jun. 21, 2012

(51) Int. Cl.
*F16F 7/12* (2006.01)
(52) U.S. Cl.
USPC .......................................... 188/377; 293/132
(58) Field of Classification Search
USPC ........................... 188/377, 378; 293/132, 133
See application file for complete search history.

(56) References Cited

U.S. PATENT DOCUMENTS

| | | | |
|---|---|---|---|
| 7,766,386 B2* | 8/2010 | Spingler | 280/751 |
| 2003/0030290 A1* | 2/2003 | Yamagiwa | 293/105 |
| 2006/0011435 A1* | 1/2006 | Yamaki et al. | 188/376 |
| 2007/0085252 A1* | 4/2007 | Murayama et al. | 267/152 |
| 2007/0284896 A1* | 12/2007 | Wakabayashi et al. | 293/120 |
| 2008/0036242 A1* | 2/2008 | Glance et al. | 296/187.09 |

FOREIGN PATENT DOCUMENTS

| | | |
|---|---|---|
| JP | 7 101354 | 4/1995 |
| JP | 8 183473 | 7/1996 |
| JP | 10 244955 | 9/1998 |
| JP | 11 43069 | 2/1999 |
| JP | 2001 158377 | 6/2001 |
| JP | 2004 114912 | 4/2004 |
| JP | 2005 178710 | 7/2005 |
| JP | 2006 142905 | 6/2006 |
| JP | 2007 238028 | 9/2007 |
| JP | 2008 221863 | 9/2008 |

OTHER PUBLICATIONS

International Preliminary Report on Patentability and Written Opinion issued Apr. 19, 2012 in patent application No. PCT/JP2009/065996 filed Sep. 14, 2009.
International Search Report Issued Oct. 20, 2009 in PCT/JP09/65996 Filed Sep. 14, 2009.

* cited by examiner

*Primary Examiner* — Christopher Schwartz
(74) *Attorney, Agent, or Firm* — Oblon, Spivak, McClelland, Maier & Neustadt, L.L.P.

(57) ABSTRACT

There is provided a shock absorbing structure that can improve shock absorption performance by stabilizing the compressive deformation of a shock absorbing member in an axial direction. High-strength portions controlling deformation and low-strength portions controlling deformation are alternately disposed. Accordingly, when a shock is applied to a front side member from the front side of a vehicle, the front side member can be deformed in the shape of a bellows. Further, the respective low-strength portions, which are disposed closer to a rear end side in a longitudinal direction, have higher strength. Therefore, the front side member can be sequentially deformed from a front end side.

4 Claims, 7 Drawing Sheets

SHOCK ABSORBING STRUCTURE

TECHNICAL FIELD

The present invention relates to a shock absorbing structure that absorbs a shock.

BACKGROUND ART

A shock absorbing structure where a plurality of beads are formed at the corners of a front side member is known as a shock absorbing structure in the related art (for example, see Patent Document 1). This shock absorbing structure includes reinforcing wall portions between the plurality of beads of the front side member. Since the shock absorbing structure has this configuration, the shock absorbing structure can absorb a shock at the time of a collision.

CITATION LIST

Patent Literature

[Patent Document 1] Japanese Unexamined Patent Application Publication No. 07-101354

SUMMARY OF INVENTION

Technical Problem

Here, the above-mentioned shock absorbing structure has required the stabilization of the compressive deformation of a shock absorbing member such as a front side member in an axial direction and has further required the improvement of shock absorption performance.

The invention has been made to solve these problems. An object of the invention is to provide a shock absorbing structure that can improve shock absorption performance by stabilizing the compressive deformation of a shock absorbing member in an axial direction.

Solution to Problem

A shock absorbing structure according to the invention includes a shock absorbing member that extends from one end side toward the other end side, a plurality of first deformation controlling portions that are formed at the shock absorbing member and controls the deformation of the shock absorbing member by adjusting strength, and a plurality of second deformation controlling portions that are formed at the shock absorbing member and controls the deformation of the shock absorbing member by adjusting strength. The plurality of first deformation controlling portions are disposed at a predetermined interval in a longitudinal direction of the shock absorbing member. The plurality of second deformation controlling portions are disposed at a predetermined interval in the longitudinal direction. At least one of the plurality of first deformation controlling portions are disposed between a pair of the second deformation controlling portions. The plurality of first deformation controlling portions include a set of first deformation controlling portions formed so that the first deformation controlling portions disposed closer to the other end side in the longitudinal direction have higher strength.

According to the shock absorbing structure of the invention, at least one of the first deformation controlling portions is disposed between the pair of the second deformation controlling portions. That is, the first and second deformation controlling portions are disposed at least alternately. For example, deformation is facilitated by the reduction of the strength of the first deformation controlling portions, and deformation becomes difficult by the increase of the strength of the second deformation controlling portions. In this case, when a shock is applied to the shock absorbing member in the longitudinal direction, the shock absorbing member can be deformed in the shape of a bellows. Further, the first deformation controlling portions, which are disposed closer to the other end side in the longitudinal direction, have higher strength. Accordingly, the shock absorbing member can be sequentially deformed from one end side. According to the above description, the compressive deformation of the shock absorbing member in an axial direction is stabilized, so that shock absorption performance is improved.

In the shock absorbing structure according to the invention, first strength adjusting portions, which adjust strength, may be formed at the first deformation controlling portions so as to extend in a direction crossing the longitudinal direction and second strength adjusting portions, which adjust strength, may be formed at the second deformation controlling portions so as to extend in the longitudinal direction. Since the first strength adjusting portions such as beads are formed so as to extend in the direction crossing the longitudinal direction, it is possible to effectively reduce the strength of the first deformation controlling portions. Meanwhile, since the second strength adjusting portions such as beads are formed so as to extend in the longitudinal direction, it is possible to effectively increase the strength of the second deformation controlling portions. Accordingly, the compressive deformation of the shock absorbing member in the axial direction is stabilized, so that shock absorption performance is improved.

In the shock absorbing structure according to the invention, first strength adjusting portions, which adjust strength, may be formed at the first deformation controlling portions; second strength adjusting portions, which adjust strength, may be formed at the second deformation controlling portions; a first effective cross-sectional length may be determined by the length of portions of a plurality of sides of a cross-sectional shape of the first deformation controlling portion except for the first strength adjusting portions; a second effective cross-sectional length may be determined by the length of portions of a plurality of sides of a cross-sectional shape of the second deformation controlling portion except for the second strength adjusting portions; the first effective cross-sectional length and the second effective cross-sectional length may be set so as to be different from each other; and the first deformation controlling portions include a set of first deformation controlling portions formed so that the first deformation controlling portions disposed closer to the other end side in the longitudinal direction have a larger first effective cross-sectional length. The first effective cross-sectional length and the second effective cross-sectional length are set so as to be different from each other. Accordingly, the strength of the first deformation controlling portions can be different from the strength of the second deformation controlling portions. Further, the first deformation controlling portions include first deformation controlling portions formed so that the first deformation controlling portions disposed closer to the other end side in the longitudinal direction have a larger first effective cross-sectional length. Accordingly, the shock absorbing member can be sequentially deformed from one end side. According to the above description, the compressive deformation of the shock absorbing member in the axial direction is stabilized, so that shock absorption performance is improved.

In the shock absorbing structure according to the invention, beads may be formed at the first deformation controlling portions, so that first strength adjusting portions adjusting strength are formed. Further, beads may be formed at the second deformation controlling portions, so that second strength adjusting portions adjusting strength are formed. Accordingly, the strength of the first deformation control and the strength of the second deformation controlling portions are easily adjusted.

In the shock absorbing structure according to the invention, the first deformation controlling portions may have strength lower than the strength of deformation uncontrolling portions of the shock absorbing member except for the first and second deformation controlling portions. Accordingly, when a shock is applied from one end side of the shock absorbing member, stress at the first deformation controlling portions is locally increased. The first deformation controlling portions are subjected to plastic buckling and out-of-plane deformation. Accordingly, when a shock is applied in the longitudinal direction of the shock absorbing member, the shock absorbing member can be deformed in the shape of a bellows.

In the shock absorbing structure according to the invention, the second deformation controlling portions may have strength higher than the strength of the deformation uncontrolling portions and the first deformation controlling portions may be disposed at positions that are adjacent to the second deformation controlling portions in the longitudinal direction. The first deformation controlling portions having low strength are disposed so as to be adjacent to the second deformation controlling portions having high strength. Accordingly, portions where strength changes suddenly are formed at the shock absorbing member. Therefore, when a shock is applied in the longitudinal direction of the shock absorbing member, the shock absorbing member can be deformed in the shape of a bellows at the portions where strength changes suddenly. According to the above description, the compressive deformation of the shock absorbing member in the axial direction is stabilized, so that shock absorption performance is improved.

In the shock absorbing structure according to the invention, the shock absorbing member may be formed by welding a plurality of members and welded portions between the members may be formed at the second deformation controlling portions. The welded portions can increase the strength of the second deformation controlling portions. Accordingly, it is possible to further stabilize the compressive deformation of the shock absorbing member in the axial direction.

A shock absorbing structure according to the invention includes a shock absorbing member that extends from one end side toward the other end side, a plurality of first deformation controlling portions that are formed at the shock absorbing member and controls the deformation of the shock absorbing member, and a plurality of second deformation controlling portions that are formed at the shock absorbing member and controls the deformation of the shock absorbing member. The plurality of first deformation controlling portions are disposed at a predetermined interval in a longitudinal direction of the shock absorbing member. The plurality of second deformation controlling portions are disposed at a predetermined interval in the longitudinal direction. At least one of the first deformation controlling portions is disposed between a pair of the second deformation controlling portions. First strength adjusting portions, which control the deformation of the shock absorbing member, are formed at the first deformation controlling portions so as to extend in a direction crossing the longitudinal direction. Second strength adjusting portions, which control the deformation of the shock absorbing member, are formed at the second deformation controlling portions so as to extend in the longitudinal direction.

In the shock absorbing structure according to the invention, at least one of the first deformation controlling portions is disposed between the pair of the second deformation controlling portions. That is, the first and second deformation controlling portions are disposed at least alternately. For example, deformation is facilitated by the reduction of the strength of the first deformation controlling portions, and deformation becomes difficult by the increase of the strength of the second deformation controlling portions. In this case, when a shock is applied to the shock absorbing member in the longitudinal direction, the shock absorbing member can be deformed in the shape of a bellows. In particular, the first strength adjusting portions such as beads extend in a direction crossing the longitudinal direction. Accordingly, the first strength adjusting portions can effectively reduce the strength of the first deformation controlling portions. Meanwhile, the second strength adjusting portions such as beads extend in the longitudinal direction. Therefore, the second strength adjusting portions can effectively increase the strength of the second deformation controlling portions. According to the above description, the compressive deformation of the shock absorbing member in the axial direction is stabilized, so that shock absorption performance is improved.

A shock absorbing structure according to the invention includes a shock absorbing member that extends from one end side toward the other end side, a plurality of first deformation controlling portions that are formed at the shock absorbing member and controls the deformation of the shock absorbing member, and a plurality of second deformation controlling portions that are formed at the shock absorbing member and controls the deformation of the shock absorbing member. The plurality of second deformation controlling portions are disposed at a predetermined interval in a longitudinal direction of the shock absorbing member. The second deformation controlling portions have strength higher than the strength of deformation uncontrolling portions of the shock absorbing member except for the first and second deformation controlling portions. The first deformation controlling portions are disposed so as to be adjacent to the second deformation controlling portions in the longitudinal direction of the shock absorbing member and have strength lower than the strength of the deformation uncontrolling portions.

In the shock absorbing structure according to the invention, the first deformation controlling portions having low strength are disposed so as to be adjacent to the second deformation controlling portions having high strength. Accordingly, portions where strength changes suddenly are formed at the shock absorbing member. Therefore, when a shock is applied in the longitudinal direction of the shock absorbing member, the shock absorbing member can be deformed in the shape of a bellows at the portions where strength changes suddenly. According to the above description, the compressive deformation of the shock absorbing member in the axial direction is stabilized, so that shock absorption performance is improved.

Advantageous Effects of Invention

According to the invention, it is possible to improve shock absorption performance by stabilizing the compressive deformation of a shock absorbing member in an axial direction.

DESCRIPTION OF EMBODIMENTS

Preferred embodiments of a shock absorbing structure according to the invention will be described in detail below with reference to the drawings.

First Embodiment

Figure 1:
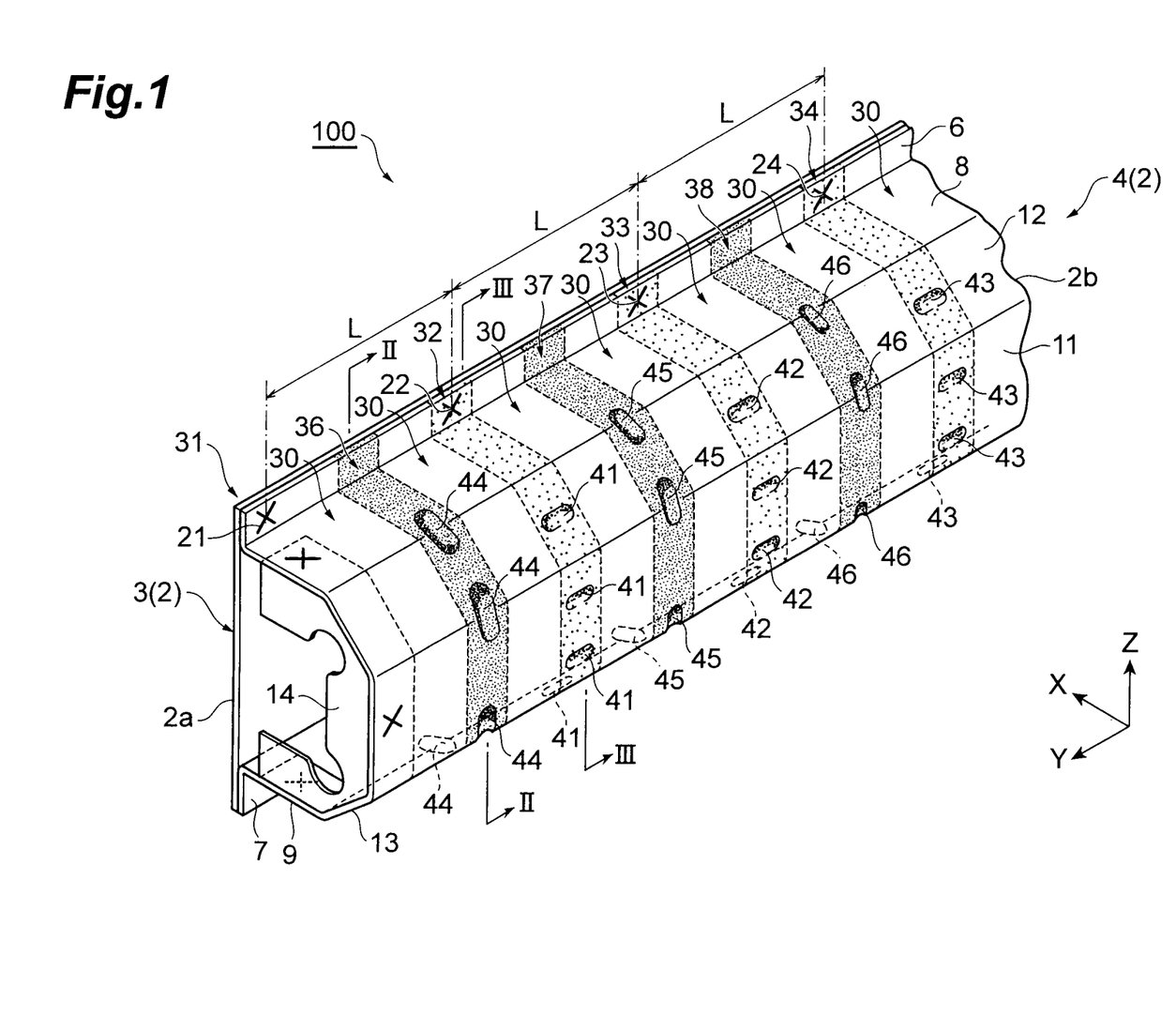
FIG. 1 is a perspective view of a shock absorbing structure according to a first embodiment of the invention.

FIG. 1 is a perspective view of a shock absorbing structure 100 according to a first embodiment of the invention. The shock absorbing structure 100 is a vehicle body structure that is provided at the front portion of a vehicle. The shock absorbing structure 100 has a function of absorbing a shock that is applied to the shock absorbing structure 100 from the front face of a vehicle body. The shock absorbing structure 100 is adapted so that the strength of the front end side portion of a front side member (shock absorbing member) 2 is adjusted. Meanwhile, in FIG. 1, a positive direction of an X axis represents the outside of a vehicle, a positive direction of a Y axis represents the front side of the vehicle, and a positive direction of a Z axis represents the upper side of the vehicle.

The front side member 2 is a hollow member that extends from a front end (one end) 2a toward a rear end (the other end) 2b. The front side member 2 has a function of absorbing a shock that is applied to the front side member 2 from the front face of the vehicle. The front side member 2 includes a front side member outer 3 that is disposed outside of the vehicle, and a front side member inner 4 that is disposed inside the vehicle. The front side member outer 3 is a flat plate-like member that extends in a longitudinal direction.

The front side member inner 4 is a member that is formed by bending a flat plate extending in the longitudinal direction. The front side member inner 4 includes a pair of flange portions 6 and 7, an upper surface portion 8, a lower surface portion 9, a side surface portion 11, an inclined surface portion 12, and an inclined surface portion 13. The pair of flange portions 6 and 7 is joined to the front side member outer 3. The upper surface portion 8 extends horizontally from the upper flange portion 6 toward the inside of the vehicle. The lower surface portion 9 extends horizontally from the lower flange portion 7 toward the inside of the vehicle. The side surface portion 11 extends vertically inside the vehicle. The inclined surface portion 12 connects the side surface portion 11 to the upper surface portion 8. The inclined surface portion 13 connects the side surface portion 11 to the lower surface portion 9.

The thickness of the front side member inner 4 is set to a value larger than $T_{min}$ that is obtained by the following expression (1). Since the thickness of the front side member inner 4 is set to a value larger than $T_{min}$, the front side member inner 4 is apt to cause stable plastic buckling deformation. Further, the front side member inner 4 can avoid the disturbance of deformation caused by an unstable elastic collapse phenomenon. Meanwhile, E denotes Young's modulus of a material, $\gamma$ denotes Poisson's ratio, $\sigma_y$ denotes yield strength, and $b_{max}$ denotes the maximum side length of a cross-section. The maximum side length means the length of the longest side of the cross-sectional shape of the front side member inner 4. In this embodiment, the length of the cross-sectional shape of the side surface portion 11 of the front side member inner 4 (that is, the width of the side surface portion 11 in a vertical direction) is the maximum side length.

[Expression 1]

$$T_{min} = \sqrt{\frac{3(1-\gamma^2)}{E\pi^2}\sigma_y \times b_{max}} \quad (1)$$

A reinforcing member 14 is mounted on the inner portion of the front end portion of the front side member inner 4, so that the front end portion of the front side member inner 4 is reinforced. Further, a welded portion 21, which connects the flange portion 6 to the front side member outer 3, is formed at the front end portion of the front side member inner 4. Furthermore, a welded portion 21, which connects the flange portion 7 to the front side member outer 3, is formed at the front end portion of the front side member inner 4. Accordingly, the front end portion of the front side member inner 4 can function as a first high-strength portion 31 of which the strength against buckling in the longitudinal direction is increased. The first high-strength portion 31 has strength higher than the strength of deformation uncontrolling portions 30 of which the strength is not adjusted. The first high-strength portion 31 has a function of controlling the deformation of the front side member 2 by suppressing the deformation of the front side member 2. The width of the first high-strength portion 31 in the longitudinal direction of the vehicle is set to about 10 to 20 mm. Meanwhile, the deformation uncontrolling portions 30 are portions of the front side member 2 except for the first high-strength portion 31, a second high-strength portion 32, a third high-strength portion 33, a fourth high-strength portion 34, a first low-strength portion 36, a second low-strength portion 37, and a third low-strength portion 38. In FIG. 1, the second high-strength portion 32, the third high-strength portion 33, and the fourth high-strength portion 34 are shown in a pale pear-skin pattern. The first low-strength portion 36, the second low-strength portion 37, and the third low-strength portion 38 are shown in a dark pear-skin pattern.

The second high-strength portion 32 is formed at the front side member inner 4 in the rear of the first high-strength portion 31 by a distance of L (mm). L is obtained by the following expression (2). The second high-strength portion 32 has strength higher than the strength of the deformation uncontrolling portions 30. The second high-strength portion 32 has a function of controlling the deformation of the front side member 2 by suppressing the deformation of the front side member 2. The second high-strength portion 32 is set over the flange portion 6, the upper surface portion 8, the inclined surface portion 12, the side surface portion 11, the inclined surface portion 13, the lower surface portion 9, and the flange portion 7 in the vertical direction of the vehicle. The width of the second high-strength portion 32 in the longitudinal direction of the vehicle is set to 10 mm or less.

[Expression 2]

$$30 \leq L \leq 0.7 \times b_{max} \quad (2)$$

Specifically, second strength adjusting portions 41, which increase strength, are formed at the second high-strength portion 32. The second strength adjusting portions 41 are formed of a plurality of beads that extend in the longitudinal direction of the front side member 2. Each of the beads, which form the second strength adjusting portions 41, has a length within the width of the second high-strength portion 32. The second strength adjusting portions 41 are formed of a bead that is formed at the inclined surface portion 12 of the second high-strength portion 32, a bead that is formed at the inclined surface portion 13 of the second high-strength portion 32, and two beads that are formed at the side surface portion 11 of the second high-strength portion 32. These beads are recessed inwardly and extend in the longitudinal direction. A welded portion 22, which is connected to the front side member outer 3, is formed at the flange portion 6 of the second high-strength portion 32. A welded portion 22, which is connected to the front side member outer 3, is formed at the flange portion 7 of the second high-strength portion 32.

The third high-strength portion 33 is formed at the front side member inner 4 in the rear of the second high-strength portion 32 by a distance of L (mm). The third high-strength portion 33 has strength higher than the strength of the deformation uncontrolling portions 30. The third high-strength portion 33 has a function of controlling the deformation of the front side member 2 by suppressing the deformation of the front side member 2. The third high-strength portion 33 is set over the flange portion 6, the upper surface portion 8, the inclined surface portion 12, the side surface portion 11, the inclined surface portion 13, the lower surface portion 9, and the flange portion 7 in the vertical direction of the vehicle. The width of the third high-strength portion 33 in the longitudinal direction of the vehicle is set to 10 mm or less.

Specifically, second strength adjusting portions 42, which increase strength, are formed at the third high-strength portion 33. The second strength adjusting portions 42 are formed of a plurality of beads that extend in the longitudinal direction of the front side member 2. Each of the beads, which form the second strength adjusting portions 42, has a length within the width of the third high-strength portion 33. The second strength adjusting portions 42 are formed of a bead that is formed at the inclined surface portion 12 of the second high-strength portion 32, a bead that is formed at the inclined surface portion 13 of the second high-strength portion 32, and two beads that are formed at the side surface portion 11 of the second high-strength portion 32. These beads are recessed inwardly and extend in the longitudinal direction. A welded portion 23, which is connected to the front side member outer 3, is formed at the flange portion 6 of the third high-strength portion 33. A welded portion 23, which is connected to the front side member outer 3, is formed at the flange portion 7 of the third high-strength portion 33.

The fourth high-strength portion 34 is formed at the front side member inner 4 in the rear of the third high-strength portion 33 by a distance of L (mm). The fourth high-strength portion 34 has strength higher than the strength of the deformation uncontrolling portions 30. The fourth high-strength portion 34 has a function of controlling the deformation of the front side member 2 by suppressing the deformation of the front side member 2. The fourth high-strength portion 34 is set over the flange portion 6, the upper surface portion 8, the inclined surface portion 12, the side surface portion 11, the inclined surface portion 13, the lower surface portion 9, and the flange portion 7 in the vertical direction of the vehicle. The width of the fourth high-strength portion 34 in the longitudinal direction of the vehicle is set to 10 mm or less.

Specifically, second strength adjusting portions 43, which increase strength, are formed at the fourth high-strength portion 34. The second strength adjusting portions 43 are formed of a plurality of beads that extend in the longitudinal direction of the front side member 2. Each of the beads, which form the second strength adjusting portions 43, has a length within the width of the fourth high-strength portion 34. The second strength adjusting portions 43 are formed of a bead that is formed at the inclined surface portion 12 of the second high-strength portion 32, a bead that is formed at the inclined surface portion 13 of the second high-strength portion 32, and two beads that are formed at the side surface portion 11 of the second high-strength portion 32. These beads are recessed inwardly and extend in the longitudinal direction. A welded portion 24, which is connected to the front side member outer 3, is formed at the flange portion 6 of the fourth high-strength portion 34. A welded portion 24, which is connected to the front side member outer 3, is formed at the flange portion 7 of the fourth high-strength portion 34.

The first low-strength portion 36 is formed at the front side member inner 4 at the middle position between the first and second high-strength portions 31 and 32. The first low-strength portion 36 has low strength against a shock in the longitudinal direction of the vehicle, as compared to the deformation uncontrolling portions 30. The first low-strength portion 36 has a function of controlling the deformation of the front side member 2 by allowing the front side member 2 to be easily deformed. Since the first low-strength portion 36 has a shape where stress concentration easily occurs at the time of a collision, the first low-strength portion 36 functions as a portion that corresponds to the peak of deformation. The first low-strength portion 36 is set over the flange portion 6, the upper surface portion 8, the inclined surface portion 12, the side surface portion 11, the inclined surface portion 13, the lower surface portion 9, and the flange portion 7 in the vertical direction of the vehicle.

Specifically, first strength adjusting portions 44, which reduce strength, are formed at the first low-strength portion 36. The first strength adjusting portions 44 are formed of a plurality of beads that extend in a direction orthogonal to the longitudinal direction of the front side member 2. The first strength adjusting portions 44 are formed of beads that are formed at the corner between the upper surface portion 8 and the inclined surface portion 12 of the first low-strength portion 36, the corner between the lower surface portion 9 and the inclined surface portion 13 of the first low-strength portion 36, the corner between the inclined surface portion 12 and the side surface portion 11 of the first low-strength portion 36, and the corner between the inclined surface portion 13 and the side surface portion 11 of the first low-strength portion 36. These beads are recessed inwardly and extend in the direction orthogonal to the longitudinal direction.

The second low-strength portion 37 is formed at the front side member inner 4 at the middle position between the second and third high-strength portions 32 and 33. The second low-strength portion 37 has strength lower than the strength of the deformation uncontrolling portions 30. The second low-strength portion 37 has strength higher than the strength of the first low-strength portion 36. The second low-strength portion 37 has a function of controlling the deformation of the front side member 2 by allowing the front side member 2 to be easily deformed. Since the second low-strength portion 37 has a shape where stress concentration easily occurs at the time of a collision, the second low-strength portion 37 functions as a portion that corresponds to the peak of deformation. The second low-strength portion 37 is set over the flange portion 6, the upper surface portion 8, the inclined surface portion 12, the side surface portion 11, the inclined surface portion 13, the lower surface portion 9, and the flange portion 7 in the vertical direction of the vehicle.

Specifically, first strength adjusting portions 45, which reduce strength, are formed at the second low-strength portion 37. The first strength adjusting portions 45 are formed of a plurality of beads that extend in a direction orthogonal to the longitudinal direction of the front side member 2. The first strength adjusting portions 45 are formed of beads that are shorter than the first strength adjusting portions 44. The first strength adjusting portions 45 are formed of beads that are formed at the corner between the upper surface portion 8 and the inclined surface portion 12 of the first low-strength portion 36, the corner between the lower surface portion 9 and the inclined surface portion 13 of the first low-strength portion 36, the corner between the inclined surface portion 12 and the side surface portion 11 of the first low-strength portion 36, and the corner between the inclined surface portion 13 and the side surface portion 11 of the first low-strength portion 36. These beads are recessed inwardly and extend in the direction orthogonal to the longitudinal direction.

The third low-strength portion 38 is formed at the front side member inner 4 at the middle position between the third and fourth high-strength portions 33 and 34. The third low-strength portion 38 has strength lower than the strength of the deformation uncontrolling portions 30. The third low-strength portion 38 has strength higher than the strength of the second low-strength portion 37. The third low-strength portion 38 has a function of controlling the deformation of the front side member 2 by allowing the front side member 2 to be easily deformed. Since the third low-strength portion 38 has a shape where stress concentration easily occurs at the time of a collision, the third low-strength portion 38 functions as a portion that corresponds to the peak of deformation. The third low-strength portion 38 is set over the flange portion 6, the upper surface portion 8, the inclined surface portion 12, the side surface portion 11, the inclined surface portion 13, the lower surface portion 9, and the flange portion 7 in the vertical direction of the vehicle.

Specifically, first strength adjusting portions 46, which reduce strength, are formed at the third low-strength portion 38. The first strength adjusting portions 46 are formed of a plurality of beads that extend in a direction orthogonal to the longitudinal direction of the front side member 2. The first strength adjusting portions 46 are formed of beads that are shorter than the first strength adjusting portions 45. The first strength adjusting portions 46 are formed of beads that are formed at the corner between the upper surface portion 8 and the inclined surface portion 12 of the first low-strength portion 36, the corner between the lower surface portion 9 and the inclined surface portion 13 of the first low-strength portion 36, the corner between the inclined surface portion 12 and the side surface portion 11 of the first low-strength portion 36, and the corner between the inclined surface portion 13 and the side surface portion 11 of the first low-strength portion 36. These beads are recessed inwardly and extend in the direction orthogonal to the longitudinal direction.

According to the above description, the respective low-strength portions 36, 37, and 38, which are disposed closer to the rear end 2b side in the longitudinal direction, sequentially have higher strength. That is, the strength of the low-strength portion closer to the front end 2a is lower, and the strength of the low-strength portion closer to the rear end 2b is higher. Meanwhile, the middle positions of the upper surface portion 8, the lower surface portion 9, the side surface portion 11, the inclined surface portion 12, and the inclined surface portion 13 in the cross-section of each of the low-strength portions 36, 37, and 38 serve as the starting point of plastic buckling. Accordingly, it is preferable that beads be not formed at the above-mentioned positions. A relationship where the strength of the low-strength portion having the highest strength is lower than that of the low-strength portion having the lowest strength is satisfied.

Figure 2:
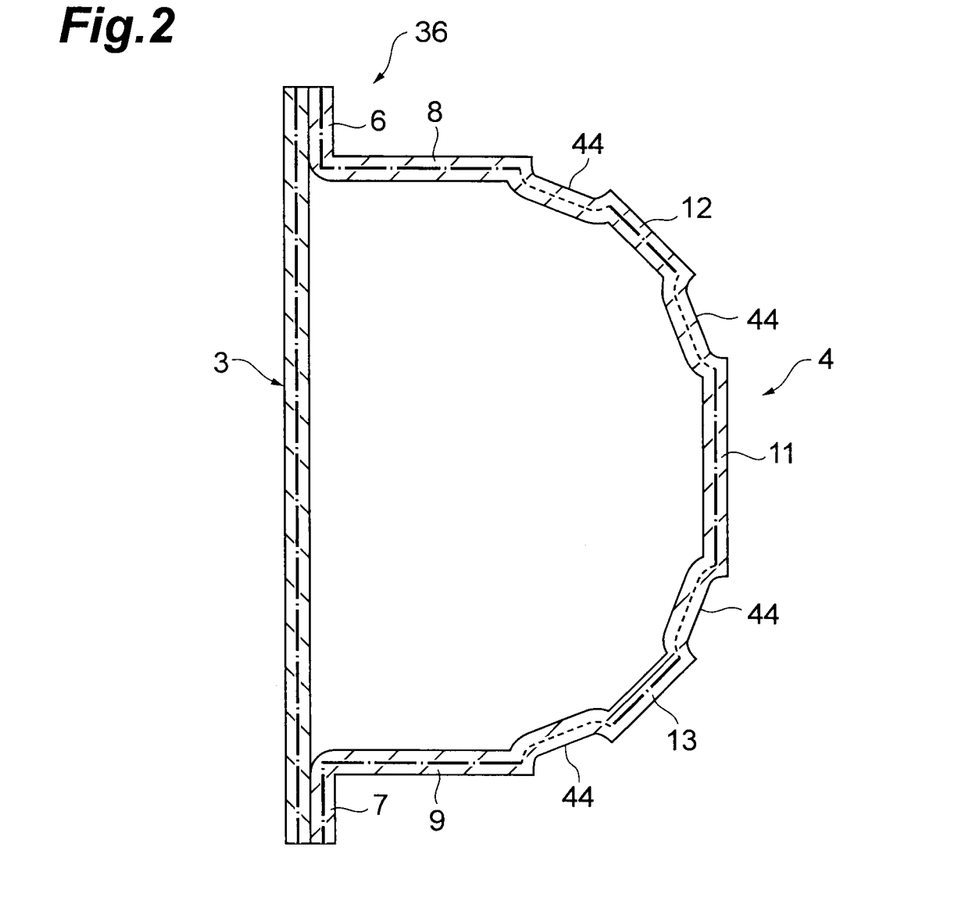
FIG. 2 is a cross-sectional view taken along a line II-II shown in FIG. 1.

FIG. 2 is a cross-sectional view taken along a line II-II shown in FIG. 1. FIG. 2 shows the cross-sectional shape of the first low-strength portion 36. The cross-sectional shape of the first low-strength portion 36 includes a plurality of sides. Specifically, the cross-sectional shape of the first low-strength portion 36 includes sides that correspond to the flange portion 6, the flange portion 7, the upper surface portion 8, the lower surface portion 9, the side surface portion 11, the inclined surface portion 12, the inclined surface portion 13, the first strength adjusting portions 44, and the front side member outer 3. The effective cross-sectional length SC1 of the first low-strength portion 36 is defined as the length that is obtained by subtracting the length of the sides corresponding to the first strength adjusting portions 44 from the sum of the lengths of the sides forming the cross-sectional shape. Specifically, the effective cross-sectional length SC1 is determined by the length of the dashed-dotted lines shown in FIG. 2. Meanwhile, in FIG. 2, a dashed-dotted line is drawn at the middle position in the thickness of the cross-sectional shape. The length of the side of the cross-sectional shape is determined on the basis of the above-mentioned position. However, the length of the side of the cross-sectional shape may be determined on the basis of the position on the outer periphery or the inner periphery of the cross-sectional shape.

The effective cross-sectional length SC2 of the second low-strength portion 37 and the effective cross-sectional length SC3 of the third low-strength portion 38 are determined by the same method as the method in the case of the effective cross-sectional length SC1 of the first low-strength portion 36. The first strength adjusting portions 45 of the second low-strength portion 37 are shorter than the first strength adjusting portions 44 of the first low-strength portion 36, and the first strength adjusting portions 46 of the third low-strength portion 38 are shorter than the first strength adjusting portions 45 of the second low-strength portion 37. Accordingly, a relationship of SC1<SC2<SC3 is satisfied among the effective cross-sectional lengths SC1, SC2, and SC3. That is, the low-strength portions 36, 37, and 38, which are disposed closer to the rear end 2b side in the longitudinal direction, have a larger effective cross-sectional length.

Figure 3:
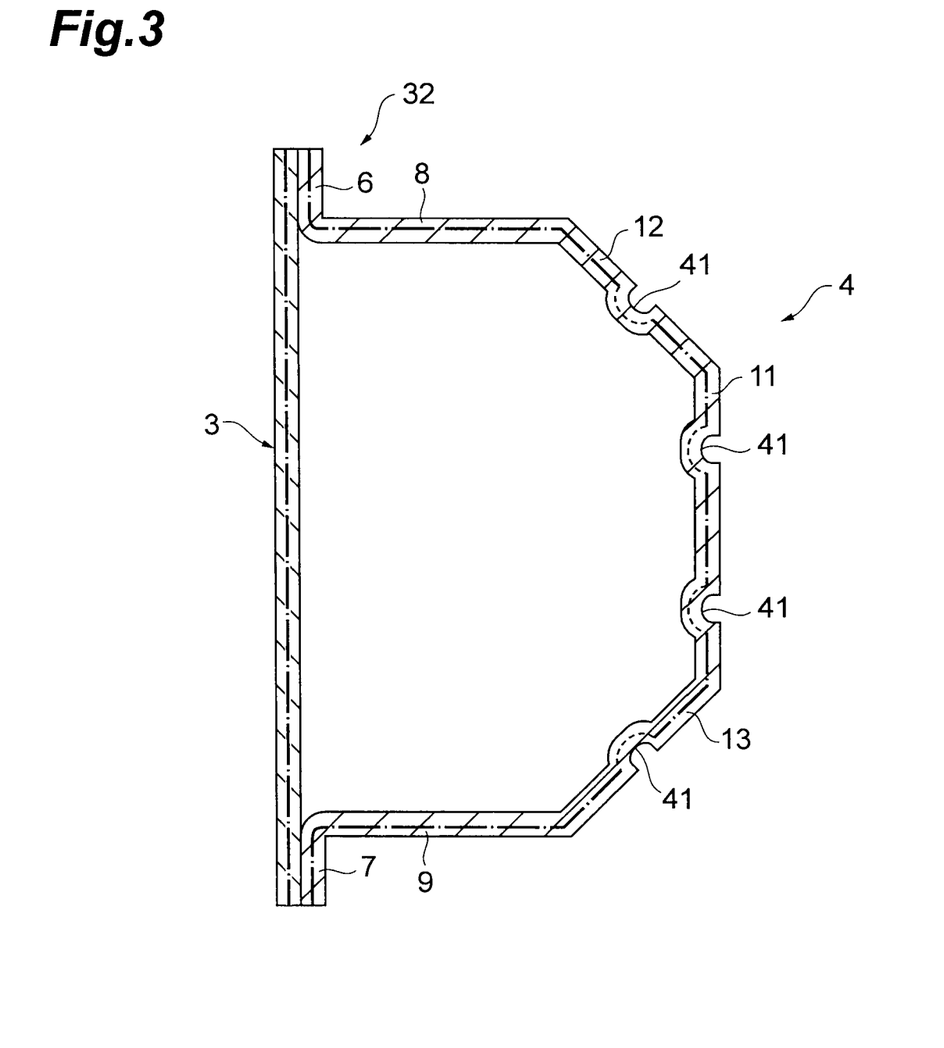
FIG. 3 is a cross-sectional view taken along a line III-III shown in FIG. 1.

FIG. 3 is a cross-sectional view taken along a line III-III shown in FIG. 1. FIG. 3 shows the cross-sectional shape of the second high-strength portion 32. The cross-sectional shape of the second high-strength portion 32 includes a plurality of sides. Specifically, the cross-sectional shape of the second high-strength portion 32 includes sides that correspond to the flange portion 6, the flange portion 7, the upper surface portion 8, the lower surface portion 9, the side surface portion 11, the inclined surface portion 12, the inclined surface portion 13, the second strength adjusting portions 41, and the front side member outer 3. The effective cross-sectional length SN of the second high-strength portion 32 is defined as the length that is obtained by subtracting the length of the sides corresponding to the second strength adjusting portions 41 from the sum of the lengths of the sides forming the cross-sectional shape. Specifically, the effective cross-sectional length SN is determined by the length of the dashed-dotted lines shown in FIG. 3. Meanwhile, in FIG. 3, a dashed-dotted line is drawn at the middle position in the thickness of the cross-sectional shape. The length of the side of the cross-sectional shape is determined on the basis of the above-mentioned position. However, the length of the cross-sectional shape may be determined on the basis of the position on the outer periphery or the inner periphery of the cross-sectional shape. Each of the effective cross-sectional lengths of the third and fourth high-strength portions 33 and 34 becomes SN. Each of the effective cross-sectional lengths SN of the high-strength portions 32, 33, and 34 is set to be larger than any one of the effective cross-sectional lengths SC1, SC2, and SC3.

Next, the operation and effect of the shock absorbing structure 100 according to the first embodiment will be described.

When a shock is applied to the front side member 2 from the front side of a vehicle, stress at each of the low-strength portions 36, 37, and 38 is locally increased. Each of the low-strength portions 36, 37, and 38 is subjected to out-of-plane deformation. The out-of-plane deformation of each of the low-strength portions 36, 37, and 38 proceeds in the longitudinal direction of the vehicle, but is received by each of the high-strength portions 31, 32, 33, and 34 having high strength. Accordingly, the front side member 2 is deformed in the shape of a bellows in a mode where each of the high-strength portions 31, 32, 33, and 34 corresponds to a half wavelength. That is, when a shock is applied to the front side member 2 in the longitudinal direction of the vehicle, the front side member 2 is deformed in the shape of a bellows so that each of the low-strength portions 36, 37, and 38 corresponds to an antinode and each of the high-strength portions 31, 32, 33, and 34 corresponds to a node. Further, the respective low-strength portions 36, 37, and 38, which are disposed closer to the rear end 2b side, have higher strength. Accordingly, the deformation of the front side member 2 sequentially occurs from the front end 2a side. According to the above description, the compressive deformation of the front side member 2 in an axial direction is stabilized, so that shock absorption performance is improved.

According to the above description, the respective high-strength portions 31, 32, 33, and 34 and the respective low-strength portions 36, 37, and 38 are alternately disposed in the shock absorbing structure 100 according to the first embodiment. Accordingly, when a shock is applied to the front side member 2 in the longitudinal direction of the vehicle, the front side member 2 can be deformed in the shape of a bellows. Further, the respective low-strength portions 36, 37, and 38, which are disposed closer to the rear end 2b side in the longitudinal direction, have higher strength. Therefore, the front side member 2 can be sequentially deformed from the front end 2a side. According to the above description, the compressive deformation of the front side member 2 in an axial direction is stabilized, so that shock absorption performance is improved.

Furthermore, in the shock absorbing structure 100 according to the first embodiment, the first strength adjusting portions 44, 45, and 46 such as beads extend in the direction orthogonal to the longitudinal direction. Accordingly, the first strength adjusting portions 44, 45, and 46 can effectively reduce the strengths of the respective low-strength portions 36, 37, and 38. Meanwhile, the second strength adjusting portions 41, 42, and 43 such as beads extend in the longitudinal direction. Accordingly, the second strength adjusting portions 41, 42, and 43 can effectively increase the strengths of the respective high-strength portions 31, 32, 33, and 34. Therefore, the compressive deformation of the front side member 2 in an axial direction is stabilized, so that shock absorption performance is improved.

Moreover, in the shock absorbing structure 100 according to the first embodiment, the effective cross-sectional lengths of the respective low-strength portions 36, 37, and 38 and the effective cross-sectional lengths of the respective high-strength portions 31, 32, 33, and 34 are different from each other. Accordingly, the strengths of the respective low-strength portions 36, 37, and 38 and the respective high-strength portions 31, 32, 33, and 34 are different from each other. Further, the respective low-strength portions 36, 37, and 38, which are disposed closer to the rear end 2b side in the longitudinal direction, have a larger effective cross-sectional length. Therefore, the front side member 2 can be sequentially deformed from the front end 2a side. According to the above description, the compressive deformation of the front side member 2 in an axial direction is stabilized, so that shock absorption performance is improved.

Furthermore, in the shock absorbing structure 100 according to the first embodiment, each of the low-strength portions 36, 37, and 38 has strength lower than the strength of the deformation uncontrolling portions 30. Accordingly, when a shock is applied to the front side member 2 from the front side of a vehicle, stress at each of the low-strength portions 36, 37, and 38 is locally increased. Each of the low-strength portions 36, 37, and 38 is subjected to plastic buckling and out-of-plane deformation. Accordingly, when a shock is applied to the front side member 2 from the front side of a vehicle, the front side member 2 can be deformed in the shape of a bellows.

Moreover, in the shock absorbing structure 100 according to the first embodiment, the welded portions 21 to 24 are formed at the high-strength portions 31, 32, 33, and 34, respectively. The welded portions 21 to 24 can increase the strengths of the high-strength portions 31, 32, 33, and 34, respectively. Accordingly, it is possible to further stabilize the compressive deformation of the front side member 2 in the axial direction.

Second Embodiment

Figure 4:
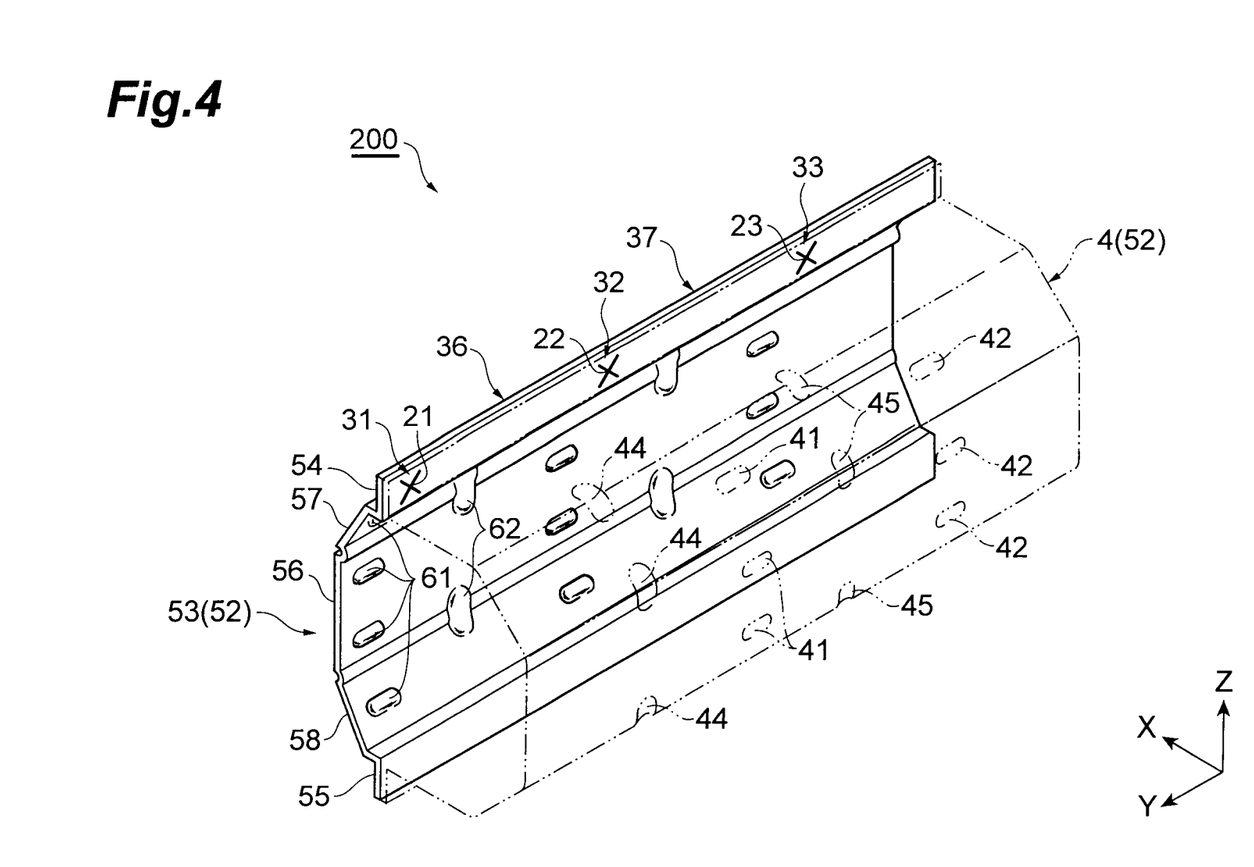
FIG. 4 is a perspective view of a shock absorbing structure according to a second embodiment of the invention.

Next, a shock absorbing structure 200 according to a second embodiment of the invention will be described with reference to FIG. 4. FIG. 4 is a perspective view of the shock absorbing structure 200 according to the second embodiment of the invention. In FIG. 4, a front side member inner 4 is shown by an imaginary line and only a front side member outer 53 is shown by a solid line. The shock absorbing structure 200 according to the second embodiment is mainly different from the shock absorbing structure 100 according to the first embodiment in that beads are formed even at the front side member outer 53.

As shown in FIG. 4, a front side member 52 of the shock absorbing structure 200 includes the front side member inner 4 and the front side member outer 53. The front side member outer 53 includes flange portions 54 and 55, a side surface portion 56, and inclined surface portions 57 and 58. Further, beads, which extend in the longitudinal direction of a vehicle, are formed at the corner between the side surface portion 56 and the inclined surface portion 57 and the corner between the side surface portion 56 and the inclined surface portion 58.

The strength of a position of the front side member outer 53, which corresponds to a first high-strength portion 31 of a front side member inner 4 as seen in a vehicle width direction, is made high. That is, second strength adjusting portions 61 are formed at the position. The second strength adjusting portions 61 are formed of reinforcing beads that are formed at the side surface portion 56 and the inclined surface portions 57 and 58. These beads are recessed inwardly and extend in the longitudinal direction. Likewise, second strength adjusting portions, which are formed of reinforcing beads, are formed at positions corresponding to the respective high-strength portions 32, 33, and 34 on the side that is closer to the rear end than the position.

The strength of a position of the front side member outer 53, which corresponds to a first low-strength portion 36 of the front side member inner 4 as seen in the vehicle width direction, is made low. That is, first strength adjusting portions 62 are formed at the position. The first strength adjusting portions 62 are formed of deformation facilitating beads that are formed at the corner between the side surface portion 56 and the inclined surface portion 57 and the corner between the side surface portion 56 and the inclined surface portion 58. These beads are recessed inwardly and extend in a direction orthogonal to the longitudinal direction. Likewise, first strength adjusting portions, which are formed of deformation facilitating beads, are formed at positions corresponding to the respective low-strength portions 37 and 38 on the side that is closer to the rear end than the position.

According to the above description, in the shock absorbing structure 200 according to the second embodiment, the strength of each of the low-strength portions 36, 37, and 38 is further reduced. Further, the strength of each of the high-strength portions 31, 32, 33, and 34 is further increased.

Third Embodiment

Figure 5:
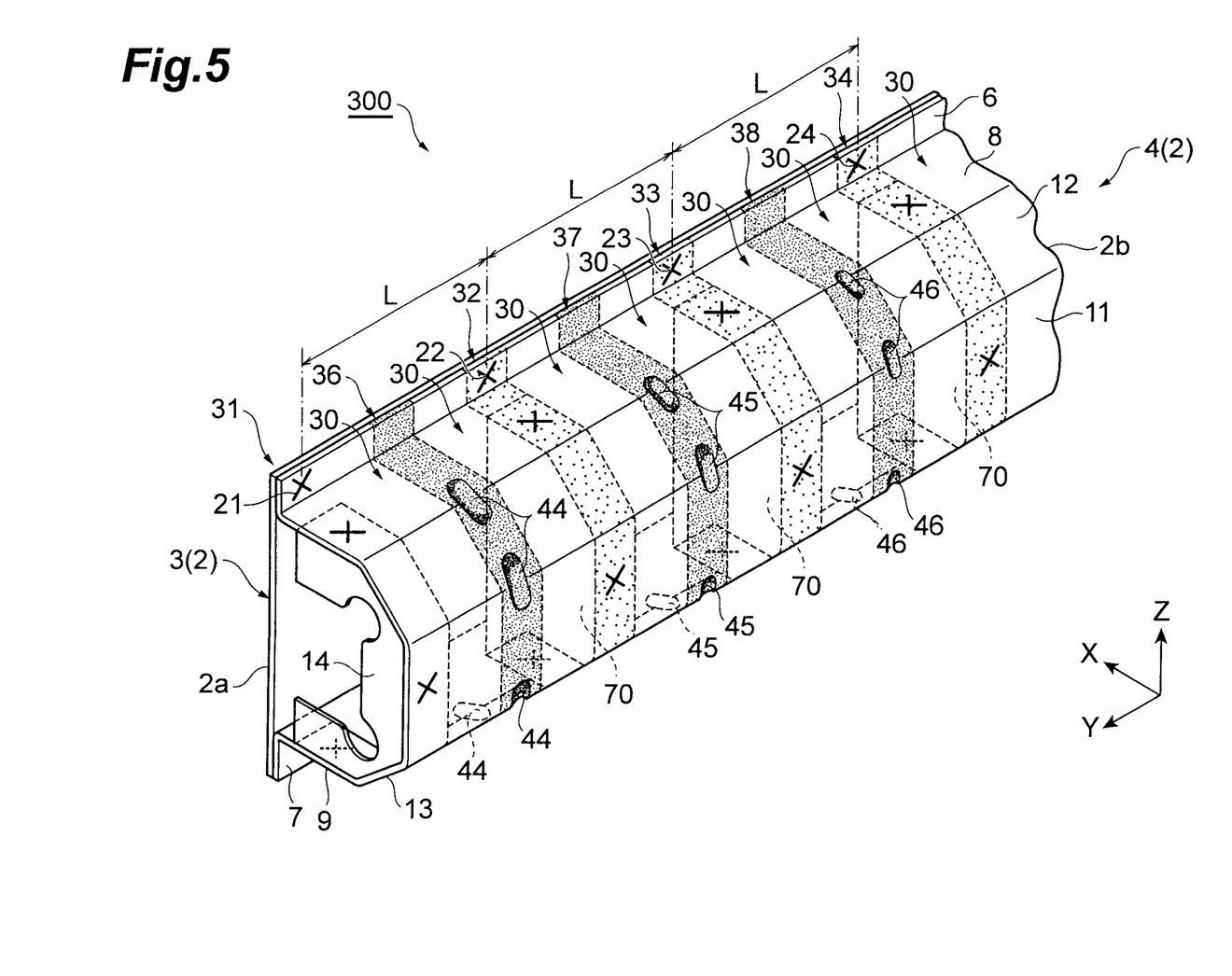
FIG. 5 is a perspective view of a shock absorbing structure according to a third embodiment of the invention.

Next, a shock absorbing structure 300 according to a third embodiment of the invention will be described with reference to FIG. 5. FIG. 5 is a perspective view of the shock absorbing structure 300 according to the third embodiment of the invention. The shock absorbing structure 300 according to the third embodiment is mainly different from the shock absorbing structure 100 according to the first embodiment in that bulkheads 70 are provided at the respective high-strength portions 32, 33, and 34.

As shown in FIG. 5, beads, which extend in the longitudinal direction, are not formed at the respective high-strength portions 32, 33, and 34. The bulkheads 70 are disposed in a front side member 2 at the respective high-strength portions 32, 33, and 34. Accordingly, the strength of each of the high-strength portions 32, 33, and 34 is increased. Therefore, when a shock is applied to the front side member 2 from the front side of a vehicle, the deformation of each of the high-strength portions 32, 33, and 34 is suppressed.

Fourth Embodiment

Figure 6:
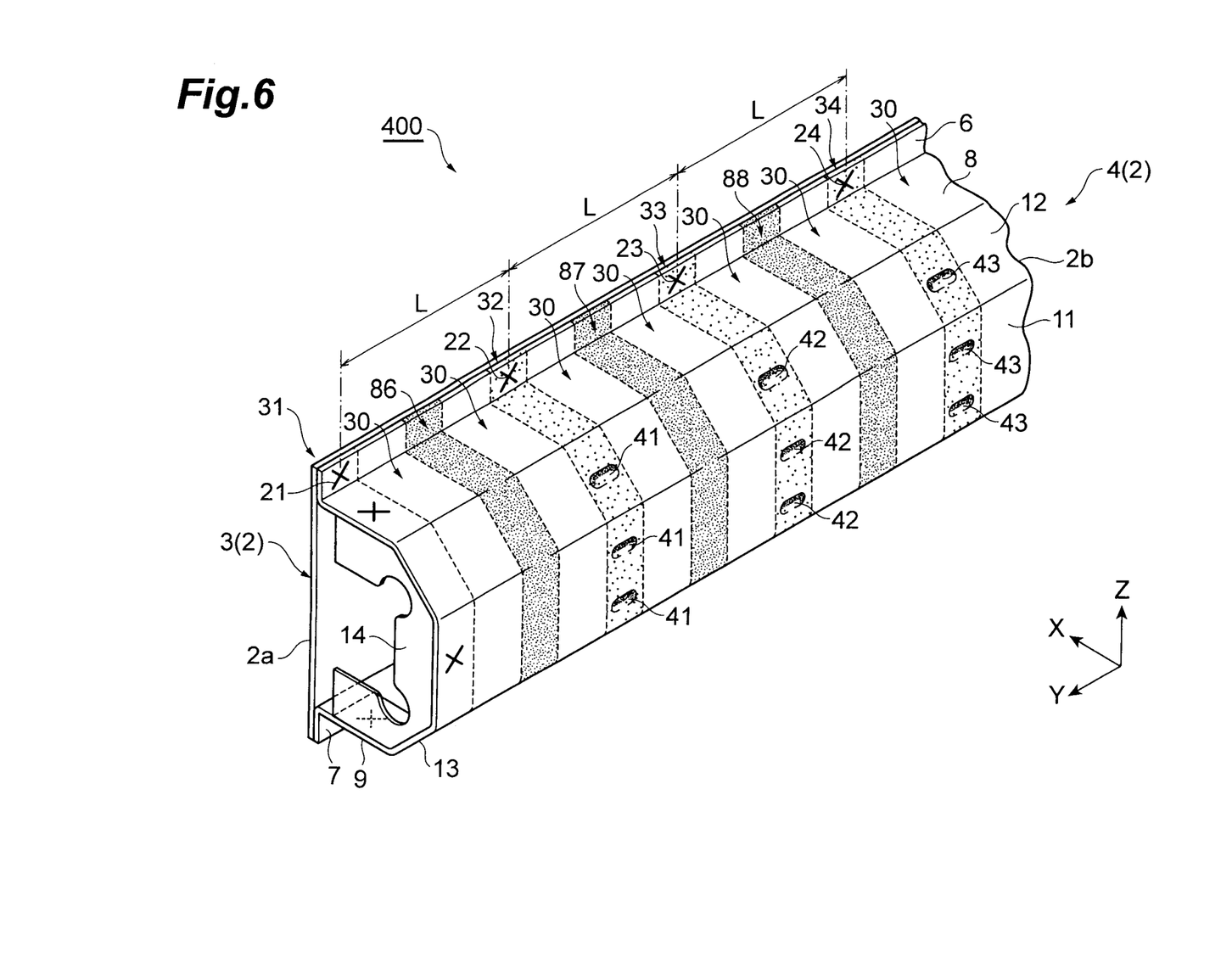
FIG. 6 is a perspective view of a shock absorbing structure according to a fourth embodiment of the invention.

Next, a shock absorbing structure 400 according to a fourth embodiment of the invention will be described with reference to FIG. 6. FIG. 6 is a perspective view of the shock absorbing structure 400 according to the fourth embodiment of the invention. The shock absorbing structure 400 according to the fourth embodiment is mainly different from the shock absorbing structure 100 according to the first embodiment in that each of low-strength portions 86, 87, and 88 is formed by heat treatment.

As shown in FIG. 6, each of the low-strength portions 86, 87, and 88 is subjected to heat treatment or the like. Accordingly, the strength of each of the low-strength portions 86, 87, and 88 is made lower than the strength of deformation uncontrolling portions 30. The strength of the second low-strength portion 87 is higher than the strength of the first low-strength portion 86, and the strength of the third low-strength portion 88 is higher than the strength of the second low-strength portion 87. According to the shock absorbing structure 400 of the fourth embodiment, it is possible to reduce the strength of each of the low-strength portions 86, 87, and 88 without forming beads. Meanwhile, the strength of each of the high-strength portions may be increased by heat treatment or the like.

Fifth Embodiment

Figure 7:
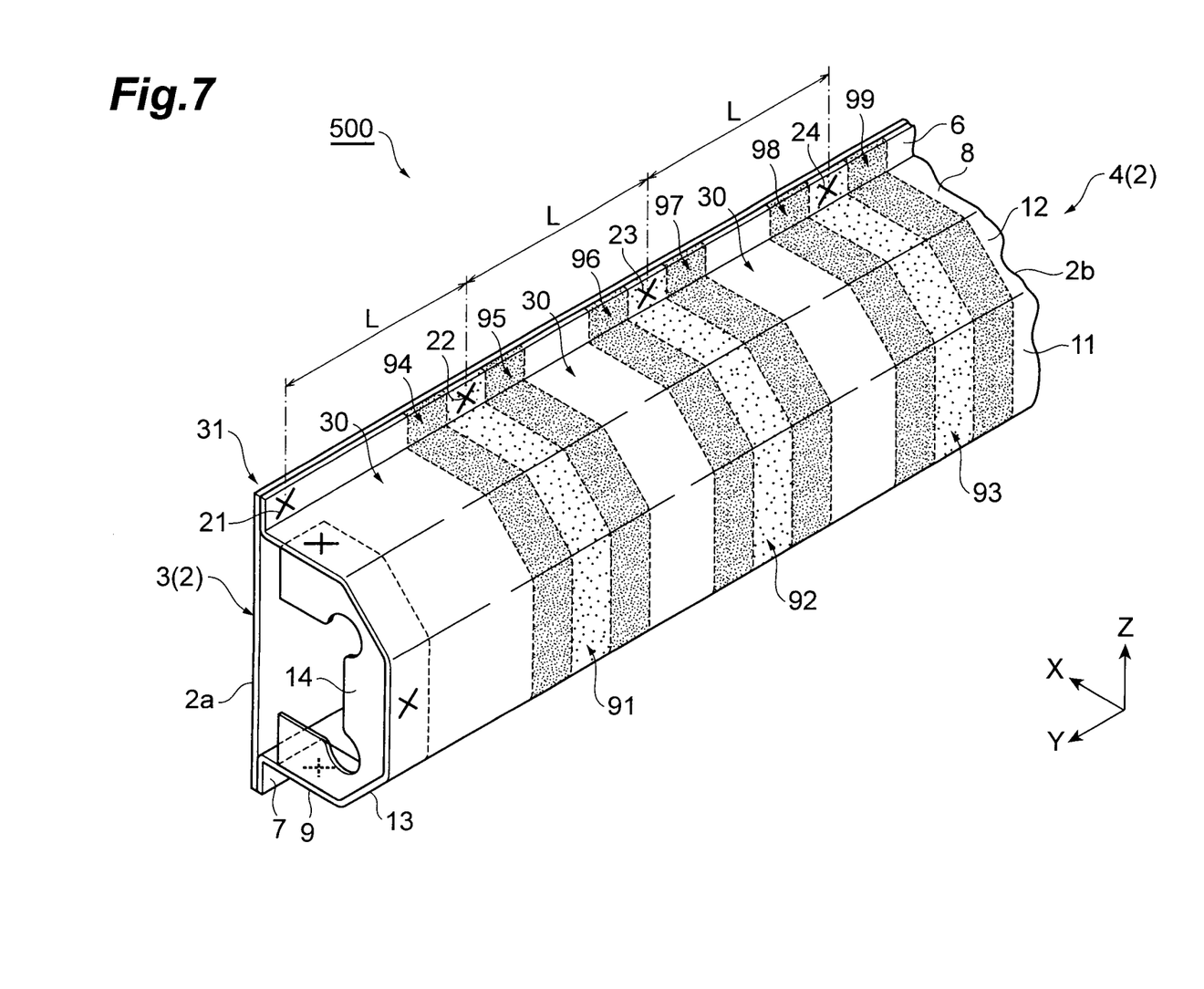
FIG. 7 is a perspective view of a shock absorbing structure according to a fifth embodiment of the invention.

Next, a shock absorbing structure 500 according to a fifth embodiment of the invention will be described with reference to FIG. 7. FIG. 7 is a perspective view of the shock absorbing structure 500 according to the fifth embodiment of the invention. The shock absorbing structure 500 according to the fifth embodiment is mainly different from the shock absorbing structure 400 according to the fourth embodiment in that low-strength portions are formed at positions adjacent to high-strength portions.

As shown in FIG. 7, each of high-strength portions 91, 92, and 93 is subjected to heat treatment. Accordingly, the strength of each of high-strength portions 91, 92, and 93 is made significantly higher than the strength of deformation uncontrolling portions 30. First and second low-strength portions 94 and 95 are formed at positions that are adjacent to both ends of the second high-strength portion 91 in the longitudinal direction of a vehicle. Third and fourth low-strength portions 96 and 97 are formed at positions that are adjacent to both ends of the third high-strength portion 92 in the longitudinal direction of the vehicle. Fifth and sixth low-strength portions 98 and 99 are formed at positions that are adjacent to both ends of the fourth high-strength portion 93 in the longitudinal direction of the vehicle. Accordingly, the first low-strength portion 94 is disposed between a first high-strength portion 31 and the second high-strength portion 91. The second and third low-strength portions 95 and 96 are disposed between second and third high-strength portions 91 and 92. The fourth and fifth low-strength portions 97 and 98 are disposed between the third and fourth high-strength portions 92 and 93.

The strength of each of the low-strength portions 94 to 99 is made lower than the strength of deformation uncontrolling portions 30 by heat treatment or the like. The difference between the strength of the third high-strength portion 92 and the strength of each of the low-strength portions 96 and 97 is made smaller than the difference between the strength of the second high-strength portion 91 and the strength of each of the low-strength portions 94 and 95. Further, the difference between the strength of the fourth high-strength portion 93 and the strength of each of the low-strength portions 98 and 99 is made smaller than the difference between the strength of the third high-strength portion 92 and the strength of each of the low-strength portions 96 and 97. That is, the difference between the strengths of the high-strength portion and the low-strength portion, which are disposed closer to the rear end, is smaller. For example, when the strengths of the respective high-strength portions 91 to 93 are equal to each other, the respective low-strength portions 94 to 99, which are disposed closer to the rear end, have higher strength. Meanwhile, low-strength portions and high-strength portions are formed even at the front side member outer 3 like in the front side member inner 4.

According to the above description, in the shock absorbing structure 500 according to the fifth embodiment, the low-strength portions 94 to 99 are disposed so as to be adjacent to the high-strength portions 31, 91, 92, and 93, respectively. Accordingly, portions where strength changes suddenly are formed at a front side member 2. Therefore, when a shock is applied to the front side member 2 from the front side of a vehicle, the front side member 2 can be deformed in the shape of a bellows at the portions where strength changes suddenly. According to the above description, the compressive deformation of the front side member 2 in an axial direction is stabilized, so that shock absorption performance is improved.

The invention is not limited to the above-mentioned embodiments.

For example, in the above-mentioned embodiments, the strength of the low-strength portion has been reduced by beads. However, the strength of the low-strength portion may be reduced by long holes.

Further, the shape of the front side member is not limited to the above-mentioned embodiments. Furthermore, the number of the low-strength portions and the number of the high-strength portions are not limited to the above-mentioned embodiments. Moreover, in the above-mentioned embodiments, the low-strength portions, which are disposed closer to the other end in the longitudinal direction, had higher strength. However, this relationship may be satisfied at a part of the plurality of low-strength portions according to a position where deformation is intended to be controlled. For example, on the front side of a low-strength portion that has low strength and is disposed close to the front end, a low-strength portion of which the strength is higher than the strength of the low-strength portion may be disposed. Alternatively, a plurality of sets of patterns, which are formed so that low-strength portions disposed closer to the other end in the longitudinal direction have higher strength, may be formed in the longitudinal direction of the front side member.

INDUSTRIAL APPLICABILITY

The invention may be used to improve the shock absorption of a vehicle.

Reference Signs List

| | |
|---|---|
| 2: | front side member (shock absorbing member) |
| 2a: | front end (one end) |
| 2b: | rear end (the other end) |
| 21, 22, 23, 24: | welded portion |
| 36, 37, 38, 86, 87, 88, 94, 95, 96, 97, 98, 99: | low-strength portion (first deformation controlling portion) |
| 32, 33, 34, 91, 92, 93: | high-strength portion (second deformation controlling portion) |
| 30: | deformation uncontrolling portion |
| 44, 45, 46, 62: | first strength adjusting portion |
| 41, 42, 43, 61: | second strength adjusting portion |
| SC1, SC2, SC3: | effective cross-sectional length (first effective cross-sectional length) |
| SN: | effective cross-sectional length (second effective cross-sectional length) |

The invention claimed is:

1. A shock absorbing structure comprising:
a shock absorbing member that extends from one end side toward an other end side;
a plurality of first deformation controlling portions that are formed at the shock absorbing member and controls the deformation of the shock absorbing member by adjusting strength; and
a plurality of second deformation controlling portions that are formed at the shock absorbing member and controls the deformation of the shock absorbing member by adjusting strength,
wherein the plurality of first deformation controlling portions are disposed at a predetermined interval in a longitudinal direction of the shock absorbing member,
the plurality of second deformation controlling portions are disposed at a predetermined interval in the longitudinal direction,
at least one of the plurality of first deformation controlling portions is disposed between a pair of the second deformation controlling portions, and
the plurality of first deformation controlling portions include a set of first deformation controlling portions formed so that a first deformation controlling portion of the set disposed closer to the other end side, in the longitudinal direction, has higher strength than a first deformation controlling portion of the set disposed closer to the one end side,
wherein first strength adjusting portions, which adjust strength, are formed at the first deformation controlling portions,
wherein second strength adjusting portions, which adjust strength, are formed at the second deformation controlling portions,
wherein a first effective cross-sectional length is determined by a length of portions of a plurality of sides of a cross-sectional shape of the first deformation controlling portions except for the first strength adjusting portions,
wherein a second effective cross-sectional length is determined by a length of portions of a plurality of sides of a cross-sectional shape of the second deformation controlling portions except for the second strength adjusting portions,
wherein the first effective cross-sectional length and the second effective cross-sectional length are set so as to be different from each other, and
wherein the plurality of the first deformation controlling portions including the set of first deformation controlling portions is formed so that the first deformation controlling portion of the set disposed closer to the other end side, in the longitudinal direction, has a larger first effective cross-sectional length than the first deformation portion of the set disposed closer to the one end side.

2. The shock absorbing structure according to claim 1, wherein the first strength adjusting portions are formed at the first deformation controlling portions so as to extend in a direction crossing the longitudinal direction, and
wherein the second strength adjusting portions are formed at the second deformation controlling portions so as to extend in the longitudinal direction.

3. The shock absorbing structure according to claim 1, wherein beads are formed at the first deformation controlling portions, so that first strength adjusting portions adjusting strength are formed, and
wherein beads are formed at the second deformation controlling portions, so that second strength adjusting portions adjusting strength are formed.

4. The shock absorbing structure according to claim 1, wherein the shock absorbing member is formed by welding a plurality of members, and
wherein welded portions between the members are formed at the second deformation controlling portions.

* * * * *